Oct. 16, 1956 J. F. MARSHALL 2,767,330
TRANSISTOR CONTROL CIRCUIT
Filed Aug. 10, 1955
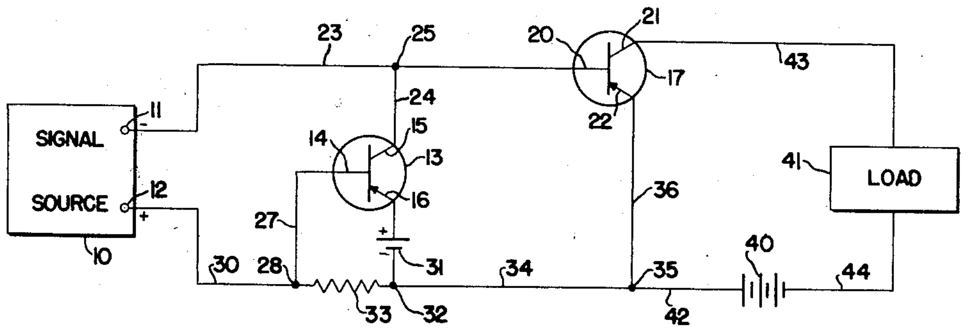
INVENTOR.
JAMES F. MARSHALL
BY Frederick E. Lange
ATTORNEY United States Patent Office
2,767,330
Patented Oct. 16, 1956

2,767,330

TRANSISTOR CONTROL CIRCUIT

James F. Marshall, Hopkins, Minn., assignor to Minneapolis-Honeywell Regulator Company, Minneapolis, Minn., a corporation of Delaware Application August 10, 1955, Serial No. 527,502

5 Claims. (Cl. 307—130)

The present invention relates to a transistor control circuit, and more particularly to a new and novel transistor switching circuit.

An object of this invention is to provide an improved and simplified transistor switching circuit.

This and other objects of my invention will be understood upon consideration of the accompanying specification, claims, and drawing of which:

The single figure of the drawing is a schematic representation of a circuit illustrating the invention.

Referring now to the figure there is shown a signal current source 10 having a pair of output terminals 11 and 12. The signal source 10 may be any suitable type. A junction transistor 13, which has been shown as a PNP junction type, has a number of electrodes including a base 14, a collector 15, and an emitter 16. A junction type power transistor 17 has a base electrode 20, a collector electrode 21, and an emitter electrode 22. A conductor 23 connects the base 20 to the terminal 11. A conductor 24 connects the collector 15 to a junction 25 on conductor 23, so that collector 15 is directly connected to terminal 11 and base 20. Base electrode 14 of transistor 13 is connected to the other source terminal 12 through a conductor 26, a junction 27, and a conductor 30.

The emitter electrode 16 of transistor 13 is connected to base electrode 14 through a suitable potential source 31, shown here as a battery, a junction 32, a resistor 33, the junction 28, and the conductor 27. Emitter electrode 16 is also connected to the emitter 22 of transistor 17 through a circuit including the potential source 31, the junction 32, a conductor 34, a junction 35, and a conductor 36. Transistor 17 acts as the switch with the collector 21 and the emitter 22 being the output terminals of the transistor. A source of relatively high potential shown as a battery 40 energizes the output circuit of the transistor 17. A suitable load device 41 through which the current is to be controlled is connected in series with battery 40. The load device, battery and output terminals form a closed circuit which may be traced from the positive terminal of battery 40 through a conductor 42, the junction 35, the conductor 36 to emitter 22, from collector 21 through a conductor 43 to the load device 41 and through a conductor 44 to the negative terminal of source 40.

The circuit has been shown with PNP type transistors however any other suitable type may be used by observing proper polarity requirements.

*Operation*

In considering the operation of this switching circuit it is desirable that transistor 17 operate in one of two conditions, either as an open circuit or as a short circuit. This will control the currents flowing through the load device 41 from approximately zero when transistor 17 is cutoff to a value determined by the impedance of the load device when the transistor is conductive. Let us assume that a relatively small signal is present at terminals 11 and 12 of the signal source 10, of a polarity as shown, where terminal 12 is positive with respect to terminal 11. Transistor 17 is now not conductive. A current path may be traced from terminal 12 through conductor 30, resistor 33, junction 32, battery 31, emitter 16, collector 15, conductor 24, junction 25, and conductor 23 back to terminal 11 of signal source 10. The transistor 13 is normally biased to a conductive state by the battery 31 which provides a bias potential for both input and output circuits of the transistor. Thus a base current flows in transistor 13 from the positive terminal of the battery 31 to emitter 16, to base 14, conductor 27, junction 28, resistor 33, and through junction 32 back to battery 31. The transistor 13 being biased in an "on" or conductive condition presents a very low impedance from emitter to collector so that the battery 31 may also be considered as being connected between emitter 22 and base 20 of transistor 17. The polarity of the bias supplied to transistor 17 by battery 31 is such as to drive the transistor 17 to cutoff, in fact, current is passed into the base 20 to reduce the grounded emitter leakage current flowing in the transistor 17 output to a value approaching $I_{co}$, the fundamental collector junction leakage current. The output impedance of transistors 17 under this condition is extremely high.

As the magnitude of the signal is increased it is apparent that the potential drop across resistor 33 must increase. For some value of signal the resultant IR drop on resistor 33, due to the flow of signal current, will equal the potential of battery 31. As the potential on base 14 approaches the potential on emitter 16, the base or input current flowing in transistor 13 tends to cease and the signal current no longer flows through the transistor 13 as the output of the transistor becomes a high impedance.

It should be noted that transistor 13 acts as a variable impedance; the output impedance being very low when the signal current is less than that required for switching, and being very high when the signal level exceeds the point of switching. As the impedance of transistor 13 becomes high the battery 31 no longer biases transistor 17 to cutoff and the signal current now switches and flows through transistor 17 from junction 32 through conductors 34 and 36, emitter 22 to base 20 and back to the signal source through conductor 23. Transistor 17 is now biased to full conduction and current flows from the positive terminal of battery 40 through conductors 42 and 36, emitter 22 to collector 21, through conductor 43 to load device 41 and then back to battery 40. A slight reduction of the signal magnitude allows current to again flow in the base circuit of transistor 13 and the circuit reverts again to the "off" position where transistor 17 is nonconductive.

In one successful embodiment of the invention, Honeywell type 2N57 transistors were used, battery 31 was 1.5 volts, and the value of resistor 33 was in the range of 20–25 ohms.

The impedance of transistor 17 was in a typical case controlled from a value in excess of 200,000 ohms to less than 0.5 ohm. A load current of 800 milliamperes was successfully switched on and off by a change in signal current of 0.5 milliampere.

Many changes and modifications of this invention may occur to those skilled in the art and I therefore wish it to be understood that I intend to be limited by the scope of the appended claims and not by the specific embodiment of my invention which is disclosed herein for the purpose of illustration only.

I claim:

1. Switching means comprising: semiconductor means having a plurality of electrodes including collector, emitter, and base electrodes, said collector and emitter electrodes being output terminals, said base and emitter electrodes being input terminals; output means including a source of power and a load device connected to the output terminals of said semiconductor means; signal input means; impedance means; circuit means including said impedance means connecting said signal input means to said input terminals of said semiconductor means; further semiconductor means having input and output electrodes one of said input terminals being an emitter electrode; circuit means connecting the input electrodes to opposite ends of said impedance means, said last named circuit means including a potential source connected between said emitter electrode and said impedance means; and means directly connecting the output electrodes of said further semiconductor means to the input terminals of said first named semiconductor means.

2. Switching means comprising: first and second semiconductor means, said means having a plurality of electrodes including collector, base, and emitter electrodes, the collector and emitter of said second semiconductor means comprising output terminals; output means to be controlled; means connecting said output means to said output terminals; impedance means having a first and a second terminal; signal input means having a pair of signal terminals; first conductive means directly connecting one of said signal terminals to the base of said second semiconductor means; second conductive means connecting the other of said signal terminals through said impedance means to the emitter of said second semiconductor means; means directly connecting the base of said first semiconductor means to the first terminal of said impedance means; a potential source; means connecting the emitter of said first semiconductor means through said potential source to the second terminal of said impedance means; and means directly connecting the collector of said first semiconductor means to the base of said second semiconductor means.

3. Transistor switching means comprising: first and second transistor means, each of said means having a plurality of electrodes including a collector, an emitter, and a base electrode; a first potential source connected directly in series with the emitter electrode of said first transistor means; means directly connecting together the collector electrode of said first transistor means to the base of said second transistor means; means directly connecting the emitter of said first transistor means through said potential source to the emitter of said second transistor means; output means; a second potential source; circuit means connecting said output means, said second potential source, and the collector and emitter terminal of said second transistor in a series loop; impedance means; signal input means having a pair of terminals; means directly connecting one of said pair of terminals to the collector of said first transistor means, and the other of said terminals to the emitter of said first transistor means through said impedance means and said first potential source; and means including said impedance means and said first potential source interconnecting the base and emitter of said first transistor means.

4. Switching means comprising: first and second semiconductor amplifying means, each of said means having input and output electrodes; signal producing means having a pair of output terminals; impedance means; means including said impedance means connecting the input electrodes of said first semiconductor means to said output terminals; load means; a source of electrical power; circuit means including said load means and said power source connected to the output electrodes of said first semiconductor means; a potential source; means including said potential source connecting the output electrodes of said second semiconductor means to the input electrodes of said first semiconductor means; and means including said impedance means and said potential source interconnecting the input electrodes of said second semiconductor means.

5. Electronic switching means comprising: first semiconductor means having a plurality of electrodes including a collector, an emitter, and a base; potential producing means connected directly in series with said emitter electrode; circuit means including impedance means connecting said base to said emitter through said potential producing means, said potential producing means biasing said semiconductor means to a conductive state; second semiconductor means having input and output electrodes; circuit means including said potential producing means directly connecting said collector and emitter electrodes to said input electrodes, said potential producing means normally maintaining said second semiconductor means in a state of non-conduction; load means; means connecting said load means to said output electrodes; and signal producing means connecting to said collector and base electrodes energizable to override the biasing effect of said potential producing means so that said second semiconductor means is rendered conductive.

No references cited.